United States Patent
Oyabu et al.

(10) Patent No.: US 8,164,626 B2
(45) Date of Patent: Apr. 24, 2012

(54) MONITORING CAMERA DEVICE

(75) Inventors: Satoru Oyabu, Kanagawa (JP); Yasuyuki Michimoto, Ishikawa (JP)

(73) Assignee: Panasonic Corporation, Osaka (JP)

( * ) Notice: Subject to any disclaimer, the term of this patent is extended or adjusted under 35 U.S.C. 154(b) by 876 days.

(21) Appl. No.: 12/280,336

(22) PCT Filed: Mar. 30, 2007

(86) PCT No.: PCT/JP2007/057061
§ 371 (c)(1), (2), (4) Date: Aug. 21, 2008

(87) PCT Pub. No.: WO2007/114327
PCT Pub. Date: Oct. 11, 2007

(65) Prior Publication Data
US 2010/0231713 A1      Sep. 16, 2010

(30) Foreign Application Priority Data
Mar. 31, 2006   (JP) ................. 2006-099623

(51) Int. Cl.
*H04N 17/00* (2006.01)

(52) U.S. Cl. ..................................... 348/143

(58) Field of Classification Search ............ 348/143
See application file for complete search history.

(56) References Cited

U.S. PATENT DOCUMENTS

| | | | | |
|---|---|---|---|---|
| 5,164,827 A * | 11/1992 | Paff | | 348/143 |
| 5,473,368 A * | 12/1995 | Hart | | 348/155 |
| 5,991,429 A * | 11/1999 | Coffin et al. | | 382/118 |
| 6,747,554 B1 * | 6/2004 | Higashimura et al. | | 340/506 |
| 7,187,300 B2 * | 3/2007 | Haney | | 340/907 |
| 7,209,588 B2 * | 4/2007 | Liang et al. | | 382/181 |
| 7,358,863 B2 * | 4/2008 | Haney | | 340/907 |
| 7,460,149 B1 * | 12/2008 | Donovan et al. | | 348/143 |
| 7,889,232 B2 * | 2/2011 | Chew | | 348/159 |

FOREIGN PATENT DOCUMENTS

| | | |
|---|---|---|
| JP | 09-93472 A | 4/1997 |
| JP | 2000-137790 | 5/2000 |
| JP | 2001-211446 | 8/2001 |
| JP | 2001-245280 | 9/2001 |
| JP | 2002-247424 | 8/2002 |
| JP | 2005-114858 | 4/2005 |

OTHER PUBLICATIONS

International Search Report for PCT/JP2007/057061; May 11, 2007.

* cited by examiner

*Primary Examiner* — David Eng
(74) *Attorney, Agent, or Firm* — Pearne & Gordon LLP

(57) ABSTRACT

The present invention provides a monitoring camera apparatus which can measure camera installation height easily with a simple configuration. The monitoring camera apparatus includes a distance detecting unit and direction detecting unit. The distance detecting unit detects subject distance D to a subject using an autofocus function. The direction detecting unit detects a shooting direction θ of the imaging unit rotated by a rotating mechanism. A height calculating unit calculates camera installation height H by converting the detected subject distance D into vertical length using the shooting direction θ in which the subject distance D is detected.

7 Claims, 5 Drawing Sheets

$H = D \sin \theta$

MONITORING CAMERA DEVICE

RELATED APPLICATION

This application claims priority from Japanese Patent Application No. 2006-99623 filed Mar. 31, 2006, which is incorporated herein by reference in its entirety.

TECHNICAL FIELD

The present invention relates to a monitoring camera apparatus equipped with a rotating mechanism.

BACKGROUND ART

Conventionally, a monitoring camera apparatus (surveillance camera apparatus) is installed above a camera installation site such as on a ceiling of a building or on an outdoor pole and captures images of a monitoring area below. The captured images are sent to a remote monitoring apparatus and displayed on a monitor. Monitoring camera apparatuses equipped with a tilt/pan rotating mechanism are known. A monitoring camera apparatus which has a function to track a subject such as a person by image processing has also been proposed. Such a conventional monitoring camera apparatus is disclosed, for example, in Japanese Patent Laid-open No. 2002-247424 (Page 3, FIG. 1, etc.).

However, conventional monitoring camera apparatuses are sometimes inconvenient because no information is available about installation height of the cameras above floor surfaces, road surfaces, and the like at the installation site. For example, when captured images are displayed on a monitor, it is not easy to get accurate information about subjects on the monitor because the installation height of the camera is unknown. Also, for example, subject detection based on captured images does not allow for differences in size among the subjects according to the installation height of the camera. This can degrade detection accuracy, resulting in false detection. Besides, false detection of subjects will affect performance of additional functions such as a tracking process.

To solve the above problems, it is conceivable to enter camera installation height manually or install a special sensor for use to detect the camera installation height. However, this will require labor and complicate configuration.

DISCLOSURE OF THE INVENTION

The present invention has been made in view of the above background and an object of the present invention is to provide a monitoring camera apparatus which can measure camera installation height easily with a simple configuration.

The present invention provides a monitoring camera apparatus comprising: an imaging unit for generating monitoring video; an autofocus function for automatically adjusting focus of the imaging unit; a rotating unit for rotating the imaging unit; a distance detecting unit for detecting subject distance from the imaging unit to a subject using the autofocus function; a direction detecting unit for detecting a shooting direction of the imaging unit; and a height calculating unit for calculating camera installation height based on the subject distance detected by the distance detecting unit and the shooting direction detected by the direction detecting unit, the height calculating unit calculating the camera installation height by converting the detected subject distance into vertical length using the shooting direction in which the subject distance is detected.

According to another aspect, the present invention provides a camera height measuring method for measuring camera installation height of a monitoring camera, comprising: a distance detecting step of detecting subject distance from an imaging unit to a subject using an autofocus function; a direction detecting step of detecting a shooting direction of the imaging unit; and a height calculating step of calculating camera installation height based on the subject distance detected by the distance detecting step and the shooting direction detected by the direction detecting step, wherein the height calculating step calculating the camera installation height by converting the detected subject distance into vertical length using the shooting direction in which the subject distance is detected.

Since the present invention is configured to calculate camera installation height based on the subject distance detected using the autofocus function and the shooting direction of the monitoring camera rotated by the rotating unit, the camera installation height can be measured easily with a simple configuration.

As described below, the present invention has other aspects. Thus, it should be understood that disclosure of the present invention is intended to introduce some aspects of the present invention, but not to limit the true scope of the present invention as set forth and defined in the appended claims.

DESCRIPTION OF SYMBOLS

Figure 1:
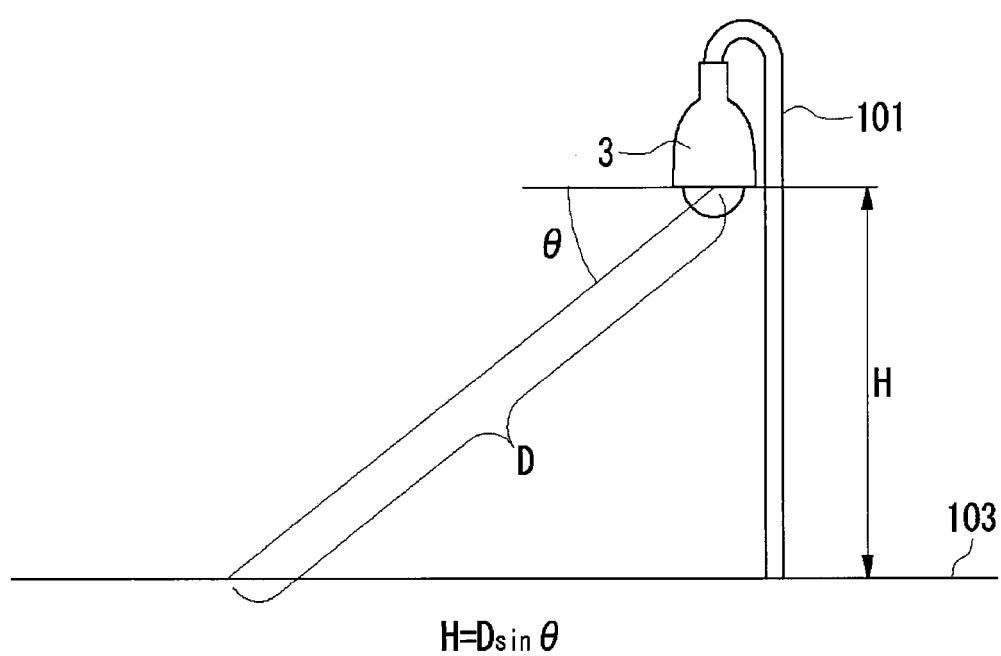
FIG. 1 shows a measurement principle of camera installation height according to an embodiment of the present invention.

3 Monitoring camera apparatus
11 Imaging unit
13 Pan and tilt mechanism
15 Camera control unit
21 Lens
23 CCD
31 Lens control unit
33 CCD control unit
35 Pan and tilt control unit
37 AF control unit
41 Height measurement mode setting unit
43 Distance detecting unit
45 Direction detecting unit
47 Height calculating unit
51 Measurement use lens control information storage unit
53 Measurement use shutter speed storage unit
55 Measurement use shooting direction storage unit
Best Mode for Carrying Out the Invention The present invention will be described in detail below. However, it should be noted that the following detailed description and accompanying drawings are not intended to limit the present invention, and that the spirit and scope of the present invention are defined only by the appended claims.

A monitoring camera apparatus according to the present invention comprises: an imaging unit which generates monitoring video; an autofocus function which automatically adjusts focus of the imaging unit; a rotating unit which rotates the imaging unit; a distance detecting unit which detects subject distance from the imaging unit to a subject using the autofocus function; a direction detecting unit which detects a shooting direction of the imaging unit; and a height calculating unit which calculates camera installation height based on the subject distance detected by the distance detecting unit and the shooting direction detected by the direction detecting unit, the height calculating unit calculating the camera installation height by converting the detected subject distance into vertical length using the shooting direction in which the subject distance is detected.

With this configuration, the subject distance is detected using the autofocus function and the camera installation height is calculated from the subject distance and shooting direction. The subject is a floor surface, road surface, and the like at the camera installation site. The camera installation height is calculated by converting the subject distance into vertical length using the shooting direction in which the subject distance is detected. Typically, the camera installation height is calculated using a trigonometric function. Since the autofocus function and a camera rotating function are used, there is no need to enter height manually. Thus, the camera installation height can be measured easily with a simple configuration.

Also, the monitoring camera apparatus may comprise a lens control information storage unit which stores predetermined measurement use lens control information which affects depth of field, as lens control information used for the imaging unit when the camera installation height is measured, and the monitoring camera apparatus may control a lens of the imaging unit according to the measurement use lens control information in the lens control information storage unit when measuring the camera installation height. This configuration makes it possible to take distance measurements using the autofocus function with the depth of field reduced, resulting in improved distance measurement accuracy and improved height measurement accuracy.

Also, the lens control information storage unit may store a measurement use aperture value (f-stop number or value) as the measurement use lens control information. This configuration makes it possible to improve the distance measurement accuracy and height measurement accuracy appropriately by decreasing the f-number and reducing the depth of field by opening an aperture.

Also, the monitoring camera apparatus may comprise a measurement use shutter speed storage unit which stores measurement use shutter speed and the monitoring camera apparatus may control the imaging unit according to the measurement use aperture value and the measurement use shutter speed when measuring the camera installation height. This configuration makes it possible to prevent saturation of a luminance level in the imaging device of the monitoring camera when the aperture is opened and thereby produce appropriate measurement results. Preferably, an electronic shutter of the imaging device is controlled.

Also, the lens control information storage unit may store a measurement use zoom factor as the measurement use lens control information. This configuration makes it possible to improve the distance measurement accuracy and height measurement accuracy appropriately by reducing the depth of field by increasing the zoom factor.

Also, the monitoring camera apparatus may comprise a measurement use shooting direction storage unit which stores a plurality of predetermined measurement use shooting directions in which the imaging unit is to be directed when measuring the camera installation height, the rotating unit may rotate the imaging unit to direct the imaging unit in the plurality of measurement use shooting directions, and the height calculating unit may calculate the camera installation height based on a plurality of subject distances obtained, respectively, in the plurality of measurement use shooting directions. This configuration improves height measurement accuracy using the plurality of subject distances obtained in the plurality of shooting directions.

Also, the height calculating unit may calculate, as the camera installation height, vertical height from an inclined plane passing through a line joining the lowest measurement point of the subject distance and the highest measurement point of the subject distance in space based on the plurality of subject distances obtained in the plurality of measurement use shooting directions. With this configuration, the camera installation height can be measured with high accuracy even if the camera installation site is inclined.

The present invention is not limited to the aspects of the monitoring camera apparatus described above. Other aspects of the present invention includes, for example, a camera height measuring method. The additional elements described in relation to the monitoring camera apparatus may be applied to the other aspects as well.

The monitoring camera apparatus according to an embodiment of the present invention will be described below with reference to the drawings.

Figure 2:
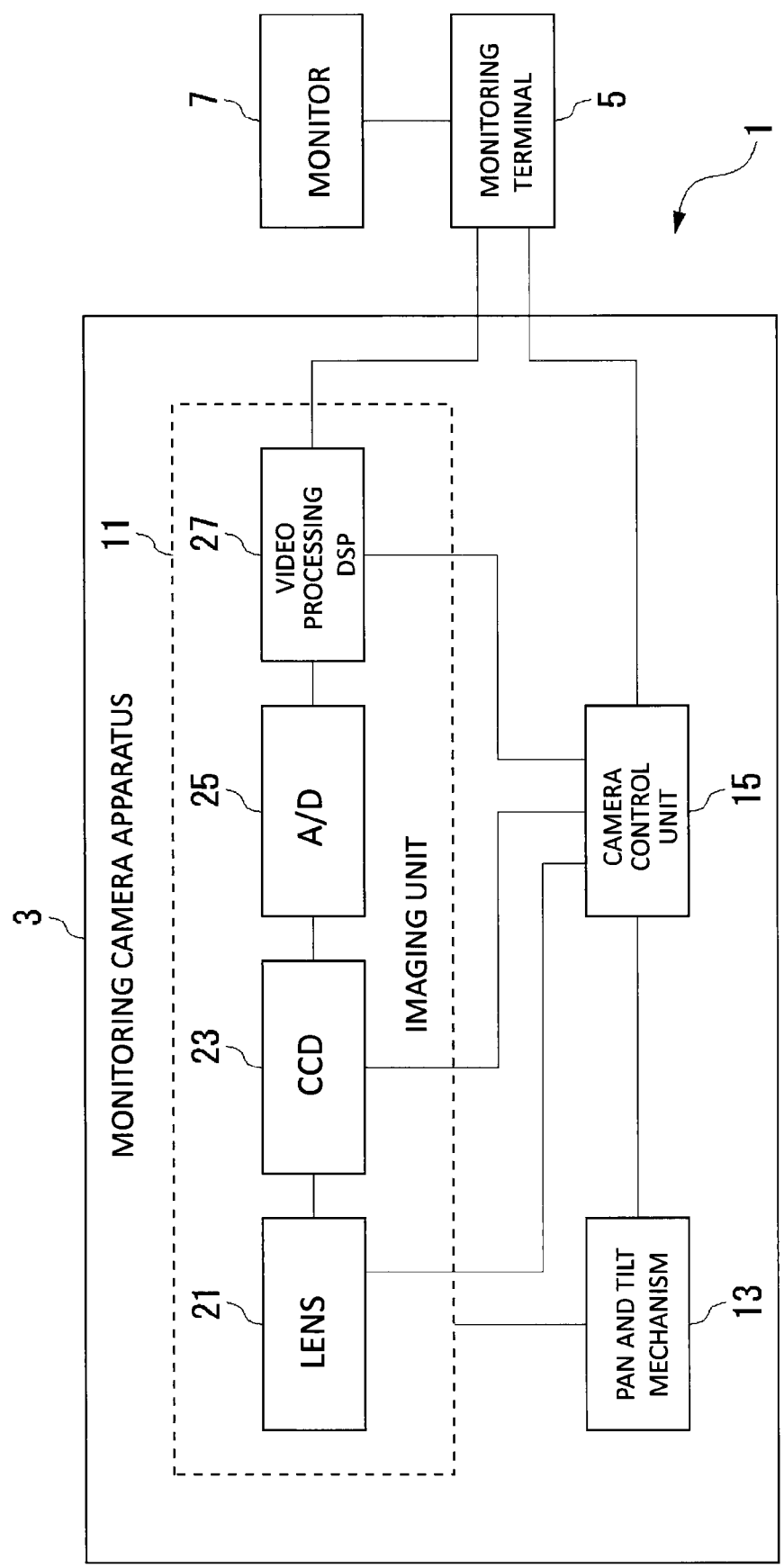
FIG. 2 shows a configuration of a monitoring system which includes a monitoring camera apparatus.
Figure 3:
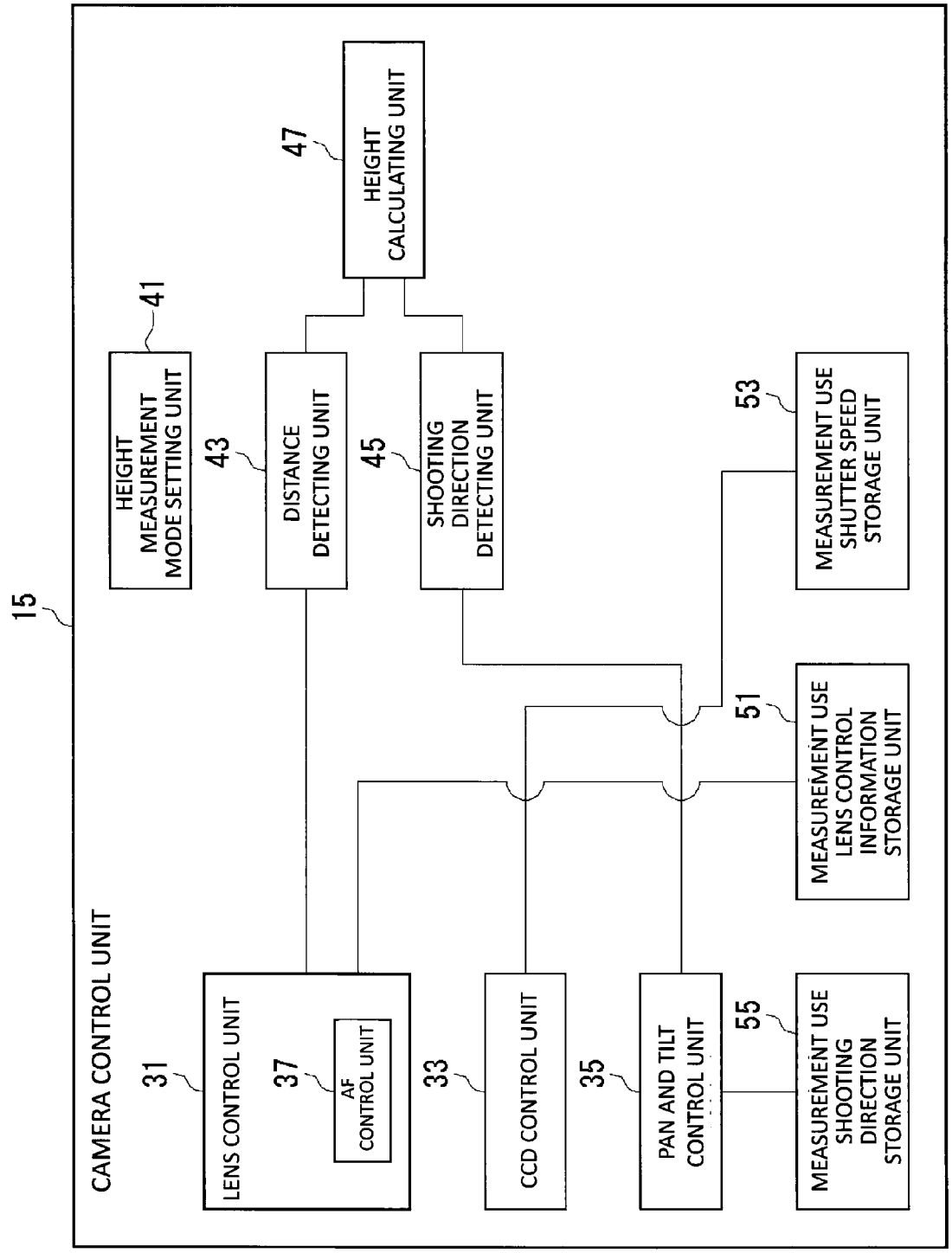
FIG. 3 shows a configuration of a camera control unit.

FIGS. 1 to 3 show the monitoring camera apparatus according to the embodiment of the present invention. FIG. 1 shows a measurement principle of camera installation height according to the embodiment, FIG. 2 shows a configuration of a monitoring (or surveillance) system which includes the monitoring (or surveillance) camera apparatus, FIG. 3 shows a camera control unit of the monitoring camera apparatus. First, a configuration of the monitoring camera apparatus will be described with reference to FIGS. 2 and 3.

In FIG. 2, the monitoring system 1 includes the monitoring camera apparatus 3, a monitoring terminal 5, and a monitor 7. The monitoring camera apparatus 3 is installed at a monitoring site and sends monitoring video to the monitoring terminal 5. The monitoring terminal 5 displays monitoring video on the monitor 7. Also, the monitoring terminal 5 accepts pan, tilt, zoom, and other camera operations from an operator. Then, a control signal for the camera operations is sent from the monitoring terminal 5 to the monitoring camera apparatus 3, which operates according to the control signal from the monitoring terminal 5.

The monitoring camera apparatus 3 generally includes an imaging unit 11, pan and tilt mechanism 13, and camera control unit 15. The imaging unit 11 includes a lens 21, CCD 23, AD conversion unit 25, and video processing DSP 27 and generates the monitoring video. The pan and tilt mechanism 13, which functions as a rotating unit, rotates the imaging unit 11. The camera control unit 15 controls the entire camera. The monitoring camera apparatus 3 is equipped with an autofocus function which automatically adjusts focus of the imaging unit 11. The autofocus function includes a lens moving mechanism including a motor attached to the lens 21, and an autofocusing function of the camera control unit 15. Furthermore, the monitoring camera apparatus 3 has a camera installation height measuring function according to the present invention. The measuring function is implemented by the autofocus function, rotating unit, and camera control unit 15.

The lens 21 of the imaging unit 11 is a zoom lens and forms a subject image on an imaging surface of the CCD 23. The lens 21 is equipped with the lens moving mechanism including the lens moving motor. The CCD 23 is a solid-state imaging device and converts the subject image formed by the lens 21 into an electrical signal. The solid-state imaging device is not limited to a CCD, and may be, for example, a CMOS. The AD conversion unit 25 converts the electrical signal of the subject image generated by the CCD 23 into a digital signal. The video processing DSP 27 processes the digital signal of the subject image and thereby generates the monitoring video. The monitoring video is outputted from the monitoring camera apparatus 3, sent to the monitoring terminal 5, and displayed on the monitor 7.

The pan and tilt mechanism 13 rotates the imaging unit 11 in a pan direction and tilt direction. Specifically, the pan and tilt mechanism 13 is configured to rotate the lens 21 of the imaging unit 11 and further rotates ancillary components such as the CCD 23 together with the lens 21. The rotation of the lens 21 changes a shooting direction (the shooting direction coincides with a direction of an optical axis of the lens 21, and thus the direction of the lens 21 will be referred to hereinafter as the shooting direction). The pan and tilt mechanism 13, which is a servo system, includes a pan-rotation motor and tilt-rotation motor which turns to change the direction of the lens 21.

The camera control unit 15 includes a microcomputer and controls the entire monitoring camera apparatus 3. By controlling the lens 21, CCD 23, and the like, the camera control unit 15 causes the monitoring camera apparatus 3 to shoot. Also, the camera control unit 15 rotates the lens 21 by controlling the pan and tilt mechanism 13, and thereby changes the shooting direction. The camera control unit 15 can operate the monitoring camera apparatus 3 according to the control signal from the monitoring terminal 5. Furthermore, the camera control unit 15 implements the autofocus function as well as the camera installation height measuring function according to the present invention, as described above.

FIG. 3 is a functional block diagram showing a configuration of the camera control unit 15. In FIG. 3, the camera control unit 15 is configured with a lens control unit 31, CCD control unit 33, pan and tilt control unit 35, and AF control unit 37 to control the monitoring camera apparatus 3. Also, the camera control unit 15 is configured with a height measurement mode setting unit 41, distance detecting unit 43, direction detecting unit 45, and height calculating unit 47 to measure camera installation height. Furthermore, the camera control unit 15 is configured with a measurement use lens control information storage unit 51, measurement use shutter speed storage unit 53, and measurement use shooting direction storage unit 55 to store information used for the camera installation height measurement.

The lens control unit 31 controls lens position, a zoom factor, an aperture, and the like of the lens 21. The CCD control unit 33 controls electronic shutter speed and the like of the CCD 23. The pan and tilt control unit 35 controls the pan motor and tilt motor of the pan and tilt mechanism 13 and thereby makes the pan and tilt mechanism 13 perform pan operation and tilt operation. The AF control unit 37 is installed in the lens control unit 31 and implements the autofocus function by controlling the lens 21.

According to the present embodiment, the AF control unit 37 is a passive type. Focus information is inputted from the video processing DSP 27 to the camera control unit 15. The focus information is represented by a high-frequency component signal in a vertical (longitudinal) direction of an image. Based on the focus information, the AF control unit 37 controls the lens 21, drives the lens moving motor, moves the lens position, and thereby achieves focus. In AF control, the lens position is adjusted in such a way as to maximize a value of a high-frequency component of the focus information.

The height measurement mode setting unit 41 sets a height measurement mode. For example, when the operator enters a height measurement command via the monitoring terminal 5, the height measurement command is sent from the monitoring terminal 5 to the monitoring camera apparatus 3 and acquired by the camera control unit 15. The camera control unit 15 sets the height measurement mode based on the height measurement command. Alternatively, the height measurement mode may be set when conditions preprogrammed in the camera control unit 15 are satisfied. Once the height measurement mode is set, various components of the camera control unit 15 carry out functions for height measurement.

The distance detecting unit 43 detects subject distance using the autofocus function. The subject distance is the distance from the imaging unit 11 to a subject. The autofocus function adjusts focus by moving the lens position. When the lens 21 is in focus, the lens position and subject distance have a one-to-one correspondence (the subject distance is a function of the lens position). Thus, the distance detecting unit 43 acquires information about the lens position from the camera control unit 15 and determines the subject distance corresponding to the lens position. For example, the camera control unit 15 may store a table of lens position and subject distance. Then, the subject distance can be determined from the lens position with reference to the table.

If the AF control unit 37 has a distance detecting function, the distance detecting unit 43 may acquire distance data of the autofocus function as it is as the subject distance. For example, if the autofocus function is an active type, the distance detecting unit 43 may directly acquire data detected by a sensor or the like and thereby detect the subject distance.

The direction detecting unit 45 detects the shooting direction of the imaging unit 11. The shooting direction corresponds to the direction of the lens 21 as described above. The direction of the lens 21 is controlled by the pan and tilt control unit 35. The direction detecting unit 45 acquires information about the direction of the lens 21 as shooting direction information from the pan and tilt control unit 35 and thereby detects the shooting direction.

The information about the lens direction may be information about turning angles of the pan motor and tilt motor and the information about the turning angles may be converted into the shooting direction.

The height calculating unit 47 calculates the camera installation height based on the subject distance detected by the distance detecting unit 43 and shooting direction detected by the direction detecting unit 45. The height calculating unit 47 converts the detected subject distance into vertical length using the shooting direction in which the subject distance is detected, and thereby calculates the camera installation height. The camera installation height is calculated using a trigonometric function.

FIG. 1 shows a principle of processing performed by the height calculating unit 47. In FIG. 1, a pole 101 is put up on the ground 103 at a camera installation site. The monitoring camera apparatus 3 is mounted on the pole 101, facing downward. Although not illustrated, the lens in a dome is tilted at a tilt angle of θ. The tilt angle θ is an angle of the lens with respect to a horizontal plane. The tilt angle corresponds to the shooting direction. If the subject distance is D, the camera installation height H is given by $$H = D \times \sin\theta$$

The camera installation height calculated by the height calculating unit 47 is sent from the camera control unit 15 to the monitoring terminal 5 and displayed on the monitor 7.

As shown in FIG. 1, the present embodiment allows the camera installation height to be measured when the shooting direction is oblique. Thus, even when a fixed object is located just under the monitoring camera apparatus 3, the camera installation height can be measured using video images which are not blocked by the fixed object.

The measurement use lens control information storage unit 51 (measurement-mode lens control information storage unit) stores measurement use lens control information (lens control information at the time of measurement, measurement-mode lens control information). The measurement use lens control information is the lens control information used for measurement of the camera installation height. The measurement use lens control information is a lens-related parameter which affects depth of field and is set to such a value that reduces the depth of field.

According to the present embodiment, specifically a measurement use aperture value (aperture value at the time of measurement, measurement-mode aperture value) is stored as the measurement use lens control information. The measurement use aperture value is set at maximum aperture or at a predetermined small value near the maximum aperture, reducing the f-number, and thus the depth of field is reduced. In the depth of field, a far point u1 (rear side of depth of field) and near point u2 (front side of depth of field) are given by Far point $u1 = f^2 u \div (f^2 - \delta F(u-f))$ Near point $u2 = f^2 u \div (f^2 + \delta F(u-f))$ f: focal length; δ: circle of confusion; u: distance to the subject According to the above equations, when the f-number is reduced by opening up the aperture, a difference between the far point and near point is decreased, reducing the depth of field.

The measurement use lens control information (measurement use aperture value in the above example) is used for lens control by the lens control unit 31 in the height measurement mode. The measurement use lens control information allows the depth of field to be reduced. Autofocusing with the reduced depth of field makes it possible to achieve more accurate focus. This improves accuracy of the subject distance detected using the autofocus function.

The measurement use shutter speed storage unit 53 (measurement-mode shutter speed storage unit) stores measurement use shutter speed (shutter speed at the time of measurement, measurement-mode shutter speed) used when the camera installation height is measured (in height measurement mode). The measurement use shutter speed is set to a predetermined short time for the following reason. According to the present embodiment, the measurement use aperture value is set to a value at or near the maximum aperture. Consequently, a normal shutter speed value will raise a luminance level to saturation, which may render the autofocus function inoperable. Therefore, the measurement use shutter speed is set to an appropriate short time so that an appropriate target luminance level (at which the autofocus function operates normally) can be achieved. The measurement use shutter speed is used by the CCD control unit 33 to control an electronic shutter of the CCD 23.

The measurement use shooting direction storage unit 55 (measurement-mode shooting direction storage unit) stores a measurement use shooting direction (shooting direction at the time of measurement, measurement-mode shooting direction) in which the lens 21 is to be directed when the camera installation height is measured. The measurement use shooting direction is set with the lens 21 facing the ground, floor surface, or the like at the installation site. The measurement use shooting direction is set so as to avoid any object above the installation site. A plurality of measurement use shooting directions are stored suitably as described later. The measurement use shooting direction is used by the pan and tilt control unit 35 to control the pan and tilt mechanism 13.

Components of the monitoring camera apparatus 3 have been described so far. Now, operation of the monitoring camera apparatus 3 will be described. Basic operation of the monitoring camera apparatus 3 has been described above: images are captured by the imaging unit 11 including the lens 21, CCD 23, AD conversion unit 25, and video processing DSP 27, and monitoring video is sent to the monitoring terminal 5 and displayed on the monitor 7. To change the shooting direction, the pan and tilt mechanism 13 rotates the imaging unit 11. Operation for measurement of the camera installation height will be described below.

Measurements of the camera installation height are taken when the height measurement mode setting unit 41 sets the height measurement mode. The height measurement mode is set, for example, by being triggered by a control signal from the monitoring terminal 5.

Once the height measurement mode is set, the pan and tilt control unit 35 reads the measurement use shooting direction out of the measurement use shooting direction storage unit 55 and controls the pan and tilt mechanism 13 so that the lens 21 will point in the measurement use shooting direction. Also, the lens control unit 31 reads the measurement use lens control information out of the measurement use lens control information storage unit 51 and controls the lens 21 based on the measurement use lens control information. According to the present embodiment, the measurement use lens control information is the aperture value. Thus, the aperture of the lens 21 is controlled based on the aperture value, and then opened up. Furthermore, the CCD control unit 33 reads the measurement use shutter speed out of the measurement use shutter speed storage unit 53 and controls the electronic shutter of the CCD 23 based on the measurement use shutter speed.

Under the controlled conditions described above, the AF control unit 37 performs an autofocus operation to achieve focus by adjusting the lens position. Once the focus is achieved, the distance detecting unit 43 detects subject distance based on information about the lens position acquired from the lens control unit 31. Also, the direction detecting unit 45 acquires the shooting direction (lens direction) information in which the subject distance is detected from the pan and tilt control unit 35. Then, the height calculating unit 47 calculates camera installation height from the subject distance and shooting direction. As shown in FIG. 1, the camera installation height H is calculated from the tilt angle θ and subject distance D using the trigonometric function, where the tilt angle θ is used as the shooting direction.

Information about the camera installation height is sent online from the camera control unit 15 to the monitoring terminal 5. The camera installation height is stored in the monitoring terminal 5 and displayed on the monitor 7. The monitor 7 also displays monitoring video. Regarding display format of the camera installation height, for example, a numeric value of the height is displayed in a predetermined location. Consequently, by looking at a computer screen, the operator can see the height from which the monitoring video is shot. Once the height of shooting position is known, situations of the monitoring site can be grasped easily from the monitoring video.

The operation of the monitoring camera apparatus 3 according to the present embodiment has been described above. Now, variations, application examples, and the like of the monitoring camera apparatus 3 according to the present embodiment will be described.

In the above embodiment, the measurement use lens control information storage unit 51 stores the measurement use aperture value as the measurement use lens control information. As a variation, the measurement use lens control information may be a measurement use zoom factor (zoom factor at the time of measurement, measurement-mode zoom factor). When the camera installation height is measured (in height measurement mode), the measurement use zoom factor is read out by the lens control unit 31. Then, based on the measurement use zoom factor, the lens control unit 31 makes the lens 21 to operate. In this state, the autofocus function operates.

The measurement use zoom factor is set at a maximum zoom factor or at a predetermined large value near the maximum zoom factor. This reduces the depth of field. Consequently, as in the case of the aperture value control, the lens 21 is focused exactly, improving the accuracy of detecting the subject distance. Incidentally, the measurement use shutter speed storage unit 53 may be omitted in this example.

Preferably, the autofocus is preferably performed in relation to a distinctive part in an image. Examples of the distinctive part include a boundary line between a carpet and wall, intersection of a white lines, and marking on a road. In passive autofocusing, a high-frequency component in a vertical direction is processed. Thus, it is preferable to process a distinctive part which changes suddenly in the vertical direction. Specifically, the measurement use shooting direction may be preset in such a way that the distinctive part will be shot in an appropriate orientation and stored in the measurement use shooting direction storage unit 55.

Also, the measurement use shooting direction storage unit 55 may store a plurality of measurement use shooting directions. The pan and tilt mechanism 13 rotates the lens 21 under the control of the pan and tilt control unit 35 to shoot in the plurality of measurement use shooting directions in sequence. An autofocus operation is performed in each of the measurement use shooting directions, the distance detecting unit 43 detects the subject distance in each measurement use shooting direction, and the height calculating unit 47 calculates camera installation height based on the plurality of subject distances thus obtained.

Specifically, in the process described above, the height calculating unit 47 calculates a plurality of camera installation heights from the plurality of subject distances respectively, and finally determines the camera installation height from the plurality of camera installation heights. Typically, the average of the plurality of camera installation heights are calculated. In this way, the use of data on the plurality of measurement use shooting directions makes it possible to reduce errors and improve height measurement accuracy.

Figure 4:
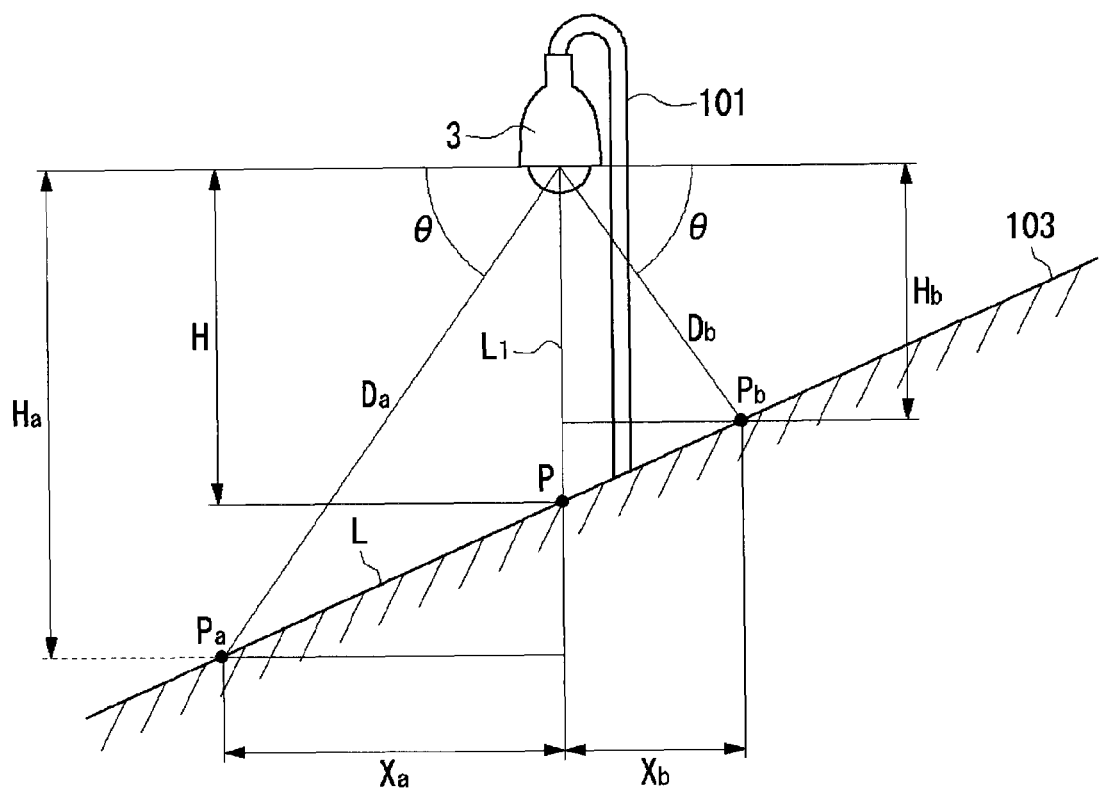
FIG. 4 shows a camera height measuring process on an inclined plane.

FIG. 4 shows another example in which a plurality of measurement use shooting directions is used. In this example, camera installation height is determined properly even when the camera installation site is inclined, as described below.

FIG. 4 shows an installation site of the monitoring camera apparatus 3. A pole 101 is put up on the ground 103. The monitoring camera apparatus 3 is mounted on the pole 101, facing downward. The ground 103 forms an inclined plane.

In this example, the tilt angle in the measurement use shooting direction is fixed. Pan angles are set at predetermined intervals through 360 degrees. For example, 18 pan angles are set at intervals of 20 degrees, bringing the number of measurement use shooting directions to 18. The subject distance of the monitoring camera apparatus 3 is measured in each measurement use shooting direction. Individual measurements are taken in the same manner as in the above embodiment. Using the plurality of subject distances, the height calculating unit 47 determines the camera installation height of the monitoring camera apparatus 3 as follows.

In FIG. 4, a measurement point Pa is the lowest point in space out of the plurality of measurement points of the plurality of subject distances measured in the plurality of shooting directions, respectively. Similarly, a measurement point Pb is the highest point in space. Since the tilt angle is fixed, the measurement point Pa gives the largest measured value of the subject distance while the measurement point Pb gives the smallest measured value of the subject distance. A line L joins the measurement points Pa and Pb. An incline which includes the line L closely resembles the ground 103.

The height calculating unit 47 calculates vertical height of the monitoring camera apparatus 3 from the inclined plane passing through the line L, as the camera installation height H. L1 corresponds to a vertical line passing through the monitoring camera apparatus 3 in FIG. 4. A point P is an intersection of the incline which includes the line L, and the vertical line L1. Distance from the intersection P to the monitoring camera apparatus 3 is the camera installation height H.

A formula for calculating the camera installation height H will be described with reference to FIG. 4. For simplicity of explanation, it is assumed here that difference between the pan angle at the measurement point Pa and the pan angle at the measurement point Pb is 180 degrees (at the measurement points Pa and Pb, measurements are taken in opposite directions). When the difference between the two pan angles is not 180 degrees, it is desirable to take the pan angles themselves into consideration.

In FIG. 4, reference character Da denotes the subject distance from the monitoring camera apparatus 3 to the measurement point Pa and reference character Db denotes the subject distance from the monitoring camera apparatus 3 to the measurement point Pb. Reference character Ha denotes the camera installation height from the measurement point Pa and reference character Hb denotes the camera installation height from the measurement point Pb. Reference character Xa denotes horizontal distance from the monitoring camera apparatus 3 to the measurement point Pa and reference character Xb denotes horizontal distance from the monitoring camera apparatus 3 to the measurement point Pb. The tilt angle $\theta$ of the monitoring camera apparatus 3 is fixed.

In this case, Ha, Hb, Xa, and Xb are calculated using the following equations.

$$Ha = Da \times \sin\theta$$

$$Hb = Db \times \sin\theta$$

$$Xa = Da \times \cos\theta$$

$$Xb = Db \times \cos\theta$$

Using Ha, Hb, Xa, and Xb, the camera installation height H is given by $$H = (Ha \times Xb + Hb \times Xa) \div (Xa + Xb)$$

By substituting Ha, Hb, Xa, and Xb into the above equation, the camera installation height H is given by $$H = (2 \times Da \times Db \times \sin\theta) \div (Da + Db)$$

According to the above equations, the height calculating unit 47 calculates the camera installation height using the subject distances at the measurement points Pa and Pb. In this way, the camera installation height of the monitoring camera apparatus 3 can be calculated properly even when the monitoring camera apparatus 3 is installed on an incline.

Figure 5:
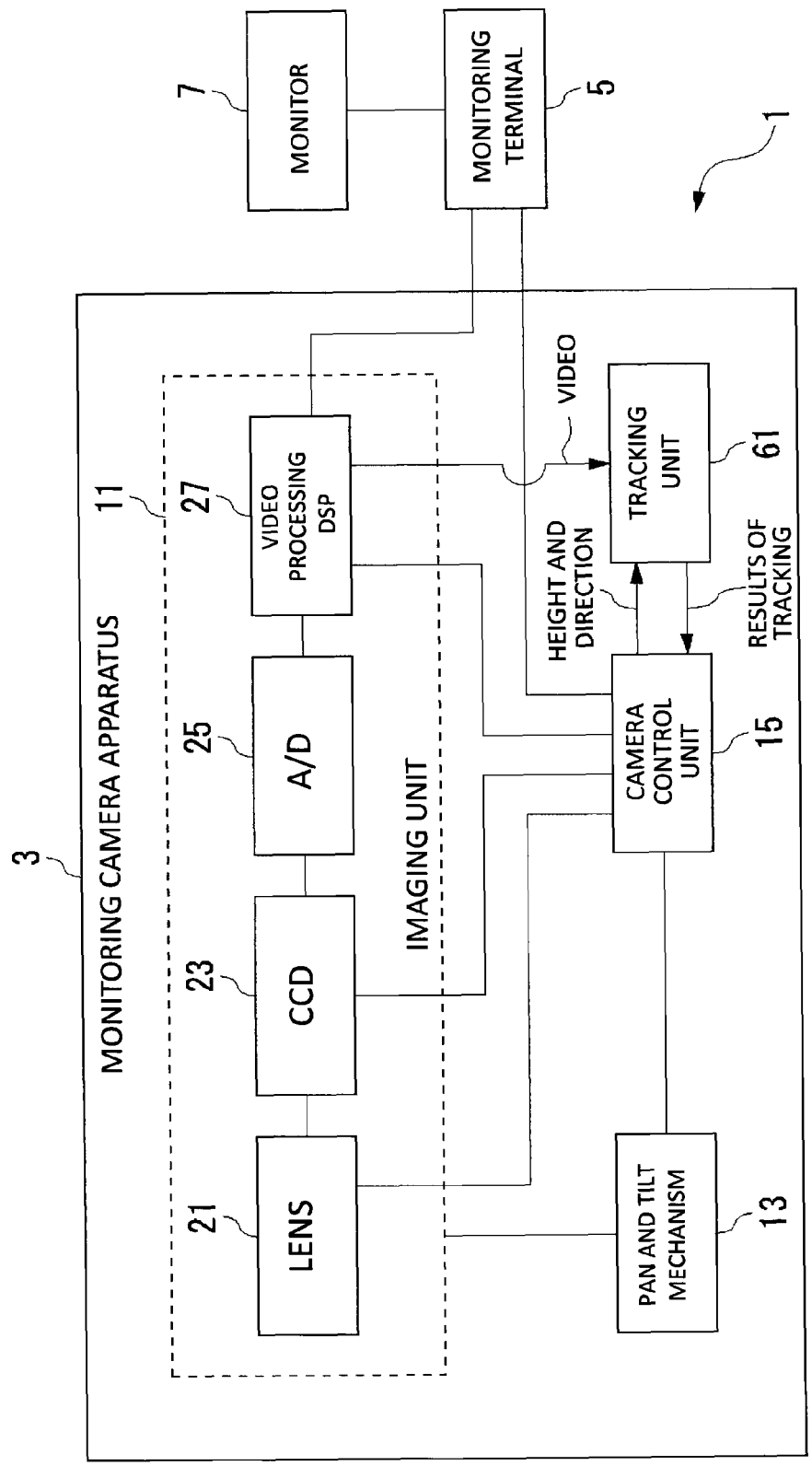
FIG. 5 shows a configuration example of a monitoring camera apparatus equipped with a tracking function.

FIG. 5 shows another configuration example of the monitoring camera apparatus 3. In FIG. 5, the monitoring camera apparatus 3 is equipped with a tracking unit 61. The tracking unit 61 is a DSP dedicated to automatic tracking. A video signal is inputted in the tracking unit 61 from the video processing DSP 27. The tracking unit 61 detects a tracking target object in the video signal, tracks the tracking target object in the video, and outputs results of tracking to the camera control unit 15. The camera control unit 15 controls the pan and tilt mechanism 13 based on the results of tracking, and consequently the lens 21 rotates, following the tracking target object.

According to the present embodiment, measured data of the camera installation height of the monitoring camera apparatus 3 is used for the tracking process. The camera installation height is supplied from the camera control unit 15 to the tracking unit 61. In this example, the camera installation height is used as follows. It is assumed here that the tracking target object is a person.

Once the camera installation height and shooting direction of the monitoring camera apparatus 3 are known, size of the person in the video is determined approximately. More specifically, the size of the person in the video mainly depends on the camera installation height and tilt angle. Thus, the tracking unit 61 stores thresholds for persons' size according to the camera installation height and tilt angle. For example, the thresholds are represented by upper and lower limit values of the persons' size in the vertical and horizontal direction. A table of the camera installation height, tilt angle, and thresholds may be stored.

The tracking unit 61 acquires data on the camera installation height and tilt angle of the monitoring camera apparatus 3 from the camera control unit 15. Then, the tracking unit 61 determines the thresholds for persons' size according to the camera installation height and tilt angle, detects any object that satisfies conditions of the thresholds, and tracks the object. The use of the thresholds for the persons' size reduces false detection and improves accuracy of tracking.

Thus, the height measurement function according to the present embodiment is useful as a function of a camera which performs high-accuracy automatic tracking. In automatic tracking of a person, the size of the person on screen varies with the camera installation height. Consequently, it is not easy to recognize what size of a subject on the screen represents a person, based on a single camera image. In such a case, information about the camera installation height, if available, can be considered in conjunction with information about the tilt angle as described above to grasp the size of a person on the screen, thereby reducing false detection of persons and improving performance of tracking.

To give further description, it is important to acquire the height information also in order to grasp spatial position. Video without height information is two-dimensional (planar) information. To capture video spatially and provide a high-accuracy detection technique using the spatial information, it is useful and important to obtain three-dimensional information by acquiring height information in the manner described above. In this respect, the present embodiment is useful in that it can automatically measure camera installation height without the need to enter height position or install a special sensor.

The monitoring camera apparatus 3 according to the present embodiment has been described above. The present embodiment detects subject distance using the autofocus function and calculates camera installation height based on the subject distance and shooting direction. That is, the present embodiment calculates the camera installation height by converting the subject distance into vertical length using the shooting direction in which the subject distance is detected. The present embodiment uses the autofocus function and camera rotating function, eliminating the need to enter height manually. Thus, the camera installation height can be measured easily with a simple configuration.

Also, according to the present embodiment, the monitoring camera apparatus 3 stores predetermined measurement use lens control information which affects the depth of field, as lens control information used for the imaging unit 11 when the camera installation height is measured. The monitoring camera apparatus 3 controls the lens according to the measurement use lens control information when measuring the camera installation height. This makes it possible to measure the distance using the autofocus function with the depth of field reduced, improving the distance measurement accuracy and height measurement accuracy.

Also, according to the present embodiment, the measurement use lens control information, for example, is the measurement use aperture value (f-stop number). This makes it possible to improve the distance measurement accuracy and height measurement accuracy appropriately by decreasing the f-number and reducing the depth of field by opening an aperture.

Also, the monitoring camera apparatus according to the present embodiment further stores measurement use shutter speed. When the camera installation height is measured, the imaging unit is controlled according to the measurement use aperture value and measurement use shutter speed. This makes it possible to prevent saturation of a luminance level in the imaging device of the monitoring camera when the aperture is opened and thereby produce appropriate measurement results.

Also, according to the present embodiment, the measurement use lens control information may be a measurement use zoom factor. This makes it possible to improve the distance measurement accuracy and height measurement accuracy appropriately by reducing the depth of field by increasing the zoom factor.

Also, the present embodiment stores a plurality of measurement use shooting directions in which the monitoring camera is to be directed through rotation and calculates the camera installation height based on a plurality of subject distances obtained, respectively, in the plurality of measurement use shooting directions. This improves height measurement accuracy.

Also, the present embodiment calculates, as the camera installation height, vertical height from an inclined plane passing through a line joining the lowest measurement point of the subject distance and the highest measurement point of the subject distance in space based on the plurality of subject distances obtained in the plurality of measurement use shooting directions. This makes it possible to measure the camera installation height with high accuracy even if the camera installation site is inclined.

A currently conceivable preferred embodiment of the present invention has been described above. However, it should be understood that various modifications can be made to the present embodiment, and all such modifications are intended to be included within the scope of the present invention, as defined by the following claims.

Industrial Applicability

The monitoring camera apparatus according to the present invention is useful as a monitoring camera and the like, having the advantage of being able to measure camera installation height easily with a simple configuration using the autofocus function and rotating function of the monitoring camera as described above.

The invention claimed is:

1. A monitoring camera apparatus comprising:
   an imaging unit for generating monitoring video;
   an autofocus function for automatically adjusting focus of the imaging unit;
   a rotating unit for rotating the imaging unit;
   a distance detecting unit for detecting subject distance from the imaging unit to a subject using the autofocus function;
   a direction detecting unit for detecting a shooting direction of the imaging unit; and
   a height calculating unit for calculating camera installation height based on the subject distance detected by the distance detecting unit and the shooting direction detected by the direction detecting unit, the height calculating unit calculating the camera installation height by converting the detected subject distance into vertical length using the shooting direction in which the subject distance is detected,
   wherein the rotating unit rotates the imaging unit to direct the imaging unit in a plurality of directions, and
   the height calculating unit calculates, as the camera installation height, vertical height from an inclined plane passing through a line joining the lowest measurement point of the subject distance and the highest measurement point of the subject distance in space based on the plurality of subject distances obtained in the plurality of measurement use shooting directions.

2. The monitoring camera apparatus according to claim 1, comprising a measurement use shooting direction storage unit for storing a plurality of predetermined measurement use shooting directions in which the imaging unit is to be directed when the camera installation height is measured,
   wherein the rotating unit rotates the imaging unit to direct the imaging unit in the plurality of measurement use shooting directions.

3. The monitoring camera apparatus according to claim 2, comprising a lens control information storage unit for storing predetermined measurement use lens control information which affects depth of field, as lens control information used for the imaging unit when the camera installation height is measured, and wherein the monitoring camera apparatus controls a lens of the imaging unit according to the measurement use lens control information in the lens control information storage unit when measuring the camera installation height.

4. The monitoring camera apparatus according to claim 3, wherein the lens control information storage unit stores a measurement use aperture value as the measurement use lens control information.

5. The monitoring camera apparatus according to claim 4, comprising a measurement use shutter speed storage unit for storing measurement use shutter speed, wherein the monitoring camera apparatus controls the imaging unit according to the measurement use aperture value and the measurement use shutter speed when measuring the camera installation height.

6. The monitoring camera apparatus according to claim 3, wherein the lens control information storage unit stores a measurement use zoom factor as the measurement use lens control information.

7. A camera height measuring method for measuring camera installation height of a monitoring camera, comprising:
   a distance detecting step of detecting subject distance from an imaging unit to a subject using an autofocus function;
   a direction detecting step of detecting a shooting direction of the imaging unit; and
   a height calculating step of calculating camera installation height based on the subject distance detected by the distance detecting step and the shooting direction detected by the direction detecting step, the height calculating step calculating the camera installation height by converting the detected subject distance into vertical length using the shooting direction in which the subject distance is detected,
   wherein the imaging unit is rotated to direct the imaging unit in a plurality of directions, and
   in the height calculating step, vertical height from an inclined plane passing through a line joining the lowest measurement point of the subject distance and the highest measurement point of the subject distance in space is calculated, as the camera installation height, based on the plurality of subject distances obtained in the plurality of measurement use shooting directions.

* * * * *